United States Patent [19]
Durm et al.

[11] Patent Number: 4,887,681
[45] Date of Patent: Dec. 19, 1989

[54] MOTOR VEHICLE, ESPECIALLY PASSENGER MOTOR VEHICLE

[75] Inventors: Juergen Durm, Ditzingen; Dieter Wagner, Oberriexingen, both of Fed. Rep. of Germany

[73] Assignee: Dr. Ing. h.c.F. Porsche AG, Fed. Rep. of Germany

[21] Appl. No.: 245,642

[22] Filed: Sep. 19, 1988

[30] Foreign Application Priority Data

Oct. 17, 1987 [DE] Fed. Rep. of Germany ....... 3735185

[51] Int. Cl.$^4$ ............................................... A47C 7/72
[52] U.S. Cl. .................................. 180/68.1; 180/903; 296/180.5
[58] Field of Search ............... 296/180.1, 180.3, 180.5, 296/217, 216; 180/68.1, 68.2, 68.3, 903

[56] References Cited

U.S. PATENT DOCUMENTS 1,603,181 10/1926 Aborn ............................. 296/216 X

FOREIGN PATENT DOCUMENTS 2851639 6/1980 Fed. Rep. of Germany .
3003565 8/1981 Fed. Rep. of Germany .
3103062 8/1982 Fed. Rep. of Germany ...... 296/216

Primary Examiner—David M. Mitchell
Assistant Examiner—Michael Mar
Attorney, Agent, or Firm—Barnes & Thornburg

[57] ABSTRACT

A motor vehicle, especially a passenger motor vehicle includes a rear engine and an air guide arrangement arranged in the rear area which is displaceable from a rest position extending flush with the adjoining body into an extended operating position, whereby the air guide arrangement extends in the operating position at a distance to the body and a transversely extending gap region disposed to the rear as viewed in the driving direction and lateral outwardly disposed longitudinally extending gap regions are closed off by cover elements. In order that the air guide arrangement can be extended relatively far, on the one hand, and the rear cover element requires as little structural space as possible in the retracted rest position of the air guide arrangement, as viewed in the longitudinal direction, on the other, the cover element for the rear gap region includes at least locally fold or pleat-like sections which in the rest position of the air guide arrangement are disposed folded-together one above the other whereas in the operating position the fold or pleat-like sections assume a nearly extended straight position to one another.

22 Claims, 4 Drawing Sheets

MOTOR VEHICLE, ESPECIALLY PASSENGER MOTOR VEHICLE

BACKGROUND AND SUMMARY OF THE INVENTION

The present invention relates to a motor vehicle, especially passenger motor vehicle with a rear engine and an air guide arrangement located in the vehicle rear area, which is adapted to be displaced from an inoperative position extending flush with the adjoining body into an extended operating position.

According to the German Patent Application No. P 36 15 584.5, Corresponding to U.S. patent application Ser. No. 048,727, filed May 11, 1987, now abandoned and its continuing application Ser. No. 303,989, filed Jan. 30, 1989. transversely extending gap areas located in the rear, as viewed in the driving direction, and laterally outwardly disposed longitudinally extending gap areas between the air guide arrangement and the body are closed off in the extended operating position of the air guide arrangement by cover elements. The cover element for the rear gap area consists in this arrangement of two rigid parts jointedly connected with each other, whereby one part is secured at the air guide arrangement and the other part at an adjusting mechanism for the air guide arrangement.

For purposes of achieving a good negative lift at the rear axle, it is necessary that the detachment edge of the air guide arrangement is arranged as high as possible and relatively far toward the rear. From that follows that a cover element of large area is required for the rear gap area between air guide arrangement and body. The rigid foldable parts of the cover element would require a relatively large space, as viewed in the vehicle longitudinal direction, when the air guide arrangement according to the aforementioned patent application is in the retracted position and under some circumstances would overlap a partial area of the inlet opening for the cooling air sucked-in by the fan which would become effective unfavorably as regards the cooling of the internal combustion engine.

It is the object of the present invention to undertake such measures at an air guide arrangement arranged in the rear area that a functionally correct admission of the internal combustion engine with cooling air is assured combined with a good negative lift at the rear axle. Furthermore, the sucking-in by the fan of exhaust gases or dirt is to be reliably prevented.

The underling problems are solved according to the present invention in that the cover element for the rear gap area includes at least locally fold-like or pleat-like sections which in the inoperative position of the air guide arrangement lie folded-together one above the other whereas, in the operating position, the fold-like or pleat-like sections assume an approximately stretched elongated position with respect to one another.

The advantages principally achieved with the present invention reside in that owing to the arrangement of fold-like sections a large-area cover element is created in the extended operating position whereas in the retracted inoperative position of the guide arrangement, the fold-like sections are disposed one above the other accordion-like-shaped and thus require relatively little structural space as viewed in the vehicle longitudinal direction so that they do not protrude into the inlet opening for the sucked-in cooling air. A simple connection between the fold-like or pleat-like sections and the adjoining areas of the cover element is created by the film-joint hinges. The part having the fold-like sections is made of two different materials in a single extrusion operation so that the manufacturing costs are kept low. The film-joint hinges consist thereby of a soft plastic material, for example, of thermoplastic polyurethane whereas the remaining areas of the cover element are made of a relatively hard plastic material such as polycarbonate, ABS or the like.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
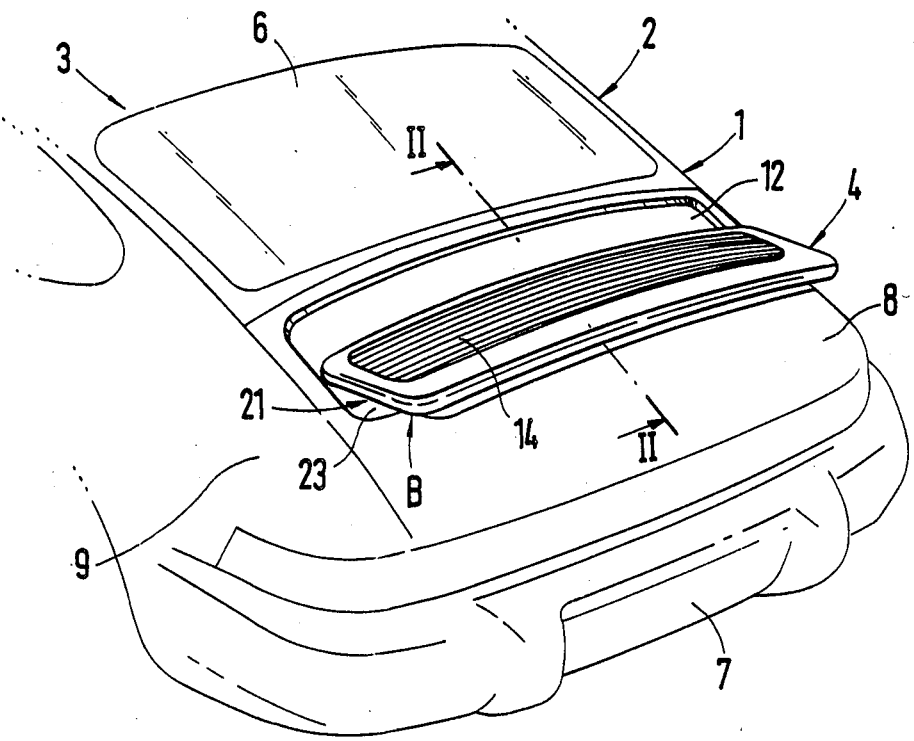
FIG. 1 is a perspective view from the rear on the rear area of a passenger motor vehicle with an air guide arrangement in accordance with the present invention.

Referring now to the drawing wherein like reference numerals are used throughout the various views to designate like parts, the passenger motor vehicle 1 includes a body 2 with an air guide arrangement 4 arranged in the rear area 3 which is adapted to be moved by means of an adjusting mechanism 5 from an inoperative retracted position A extending flush with the adjoining body 2 into an extended operating position B and vice versa. On the one hand, the air-resistance coefficient of the passenger motor vehicle 1 is reduced by the air guide arrangement 4 and, on the other, the dynamic rear wheel pressure is increased during the operation (negative lift).

Figure 2:
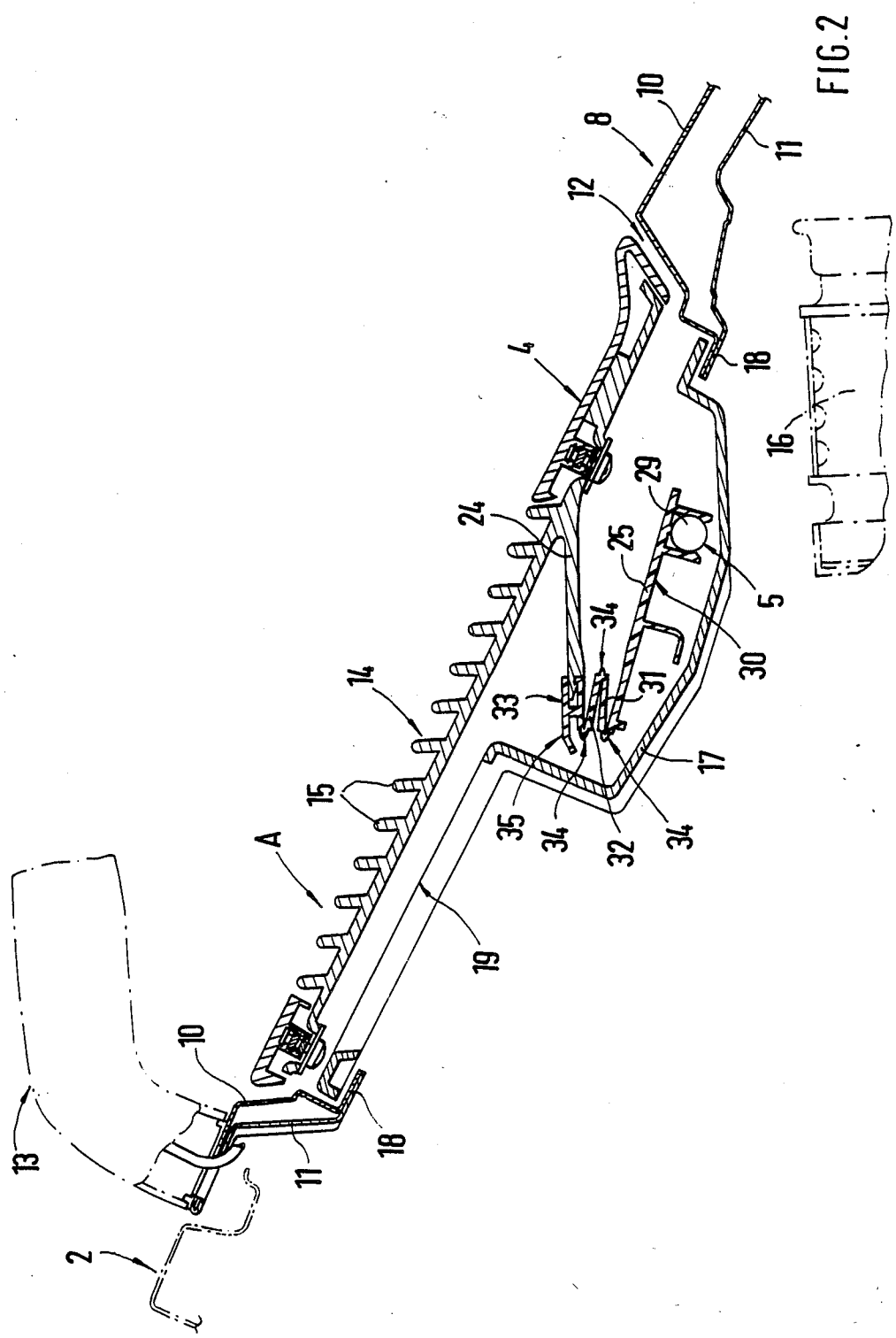
FIG. 2 is a cross-sectional view taken along line II–II of FIG. 1, on an enlarged scale, in which the air guide arrangement assumes its retracted inoperative position.

Within the rear area 3, the body 2 is composed of a rear window 6, of a bumper 7 and of a rear lid 8 which is arranged between lateral parts 9. The rear lid 8 formed of an outer part 10 and of an inner reinforcing frame 11 has an approximately rectangularly shaped opening 12 into which is inserted the air guide arrangement 4 (FIG. 2). In the inoperative position A, the flap-like-, respectively, spoiler-like-constructed air guide arrangement 4 extends with its outer surface flush with the contour of the aerodynamically shaped rear area 3 whereas in the operating position B it is pivoted out of the body plane in such a manner that its outwardly disposed attack surface is positioned approximately horizontally. At the same time, the air guide arrangement 4 is displaced rearwardly opposite the driving direction C a distance D. An auxiliary brake light 13 which is placed high is provided at the upper edge of the rear lid 8 (FIG. 2).

An air inlet grill 14 is inserted into an upper boundary surface of the air guide arrangement 4 which includes several cross struts 15. A fan 16 is arranged underneath the rear lid 8, respectively, the air guide arrangement 4, by means of which cooling air is sucked out of the vacuum region of the rear area to an air-cooled rear engine (not shown).

An approximately tub-shaped constructed cover part 17 is inserted underneath the air guide arrangement 4 into the opening 12 of the rear lid 8 which is supported at flanges 18 of the rear lid 8. In the forward area, the cover part 17 includes an aperture 19 for the cooling air sucked-in by the fan 16.

In the extended operating position B of the air guide arrangement 4, the latter extends at a distance to the body 2 disposed therebelow, as a result of which a gap is formed between the air guide arrangement 4 and the body 2. In order to avoid that exhaust gases and/or dirt particles are sucked-in by the fan 16 owing to the vacuum prevailing in the rear area 3, a gap area 20 disposed to the rear, as viewed in the driving direction, and the two lateral outwardly disposed longitudinally extending gap areas 21 between the air guide arrangement 4 and the body 2 are closed off in the extended operating Position B of the air guide arrangement 4 by cover elements 22 and 23. The cover element 22 for the rear gap area 20 consists of two parts 24 and 25 which cooperate with each other by way of a clip-in-type or snap-in-type connection. The relatively short rigidly made part 24 is constructed in one piece with the air guide arrangement 4 disposed above the same and extends obliquely downwardly, as viewed in the driving direction C.

The clip-in-type or snap-in-type connection 26 is composed of a web 27 provided with an undercut and of an approximately U-shaped profiled receiving means 28 whereby the web 27 engages sectionwise into the receiving means 28. The web 27 is formed-on at the lower end of the part 24. The other part 25 of the cover element 22 is mounted from the rear by a snap-in-type connection on a tubular cross member 29 of the adjusting mechanism 5 and is composed of a first plate-shaped area 30, of two or several adjoining pleat-like or fold-like sections 31 and 32 and of an approximately H-shaped profiled upper end area 33. The receiving means 28 of the connection 26 is integrated into the H-shaped end area 33 and forms an upper partial section thereof.

Figure 3:
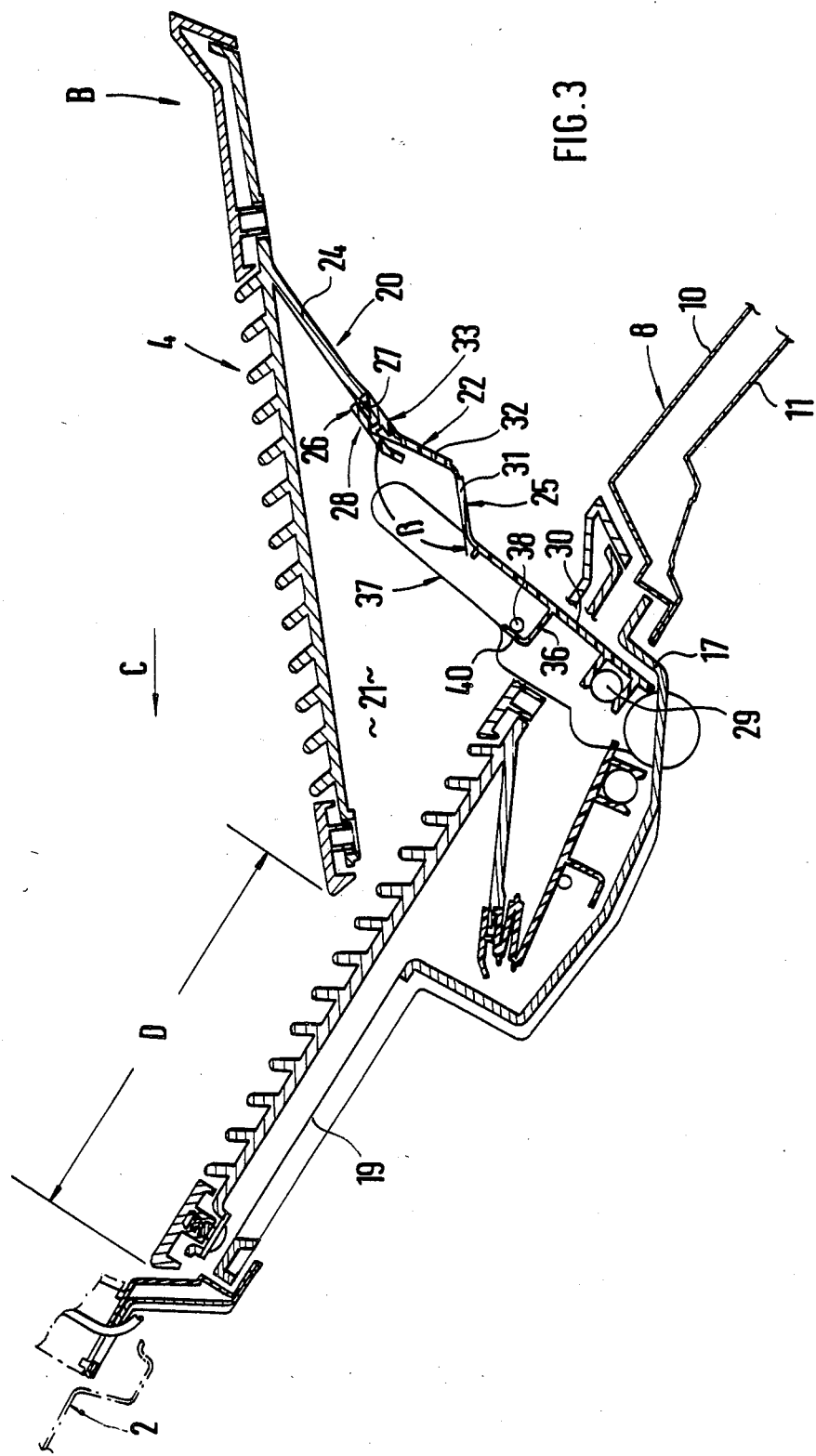
FIG. 3 is a cross-sectional view corresponding to FIG. 2, in which the extended operating position of the air guide arrangement is illustrated.
Figure 4:
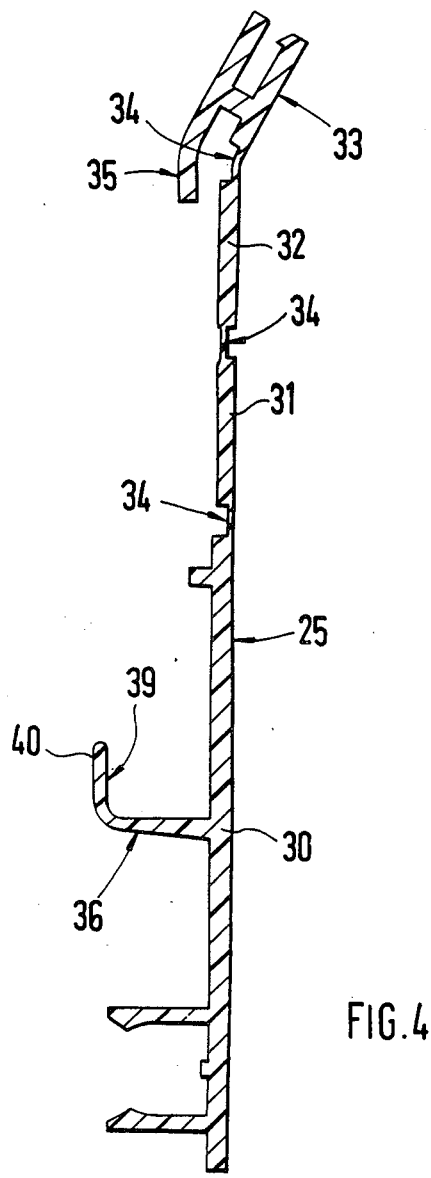
FIG. 4 is a cross-sectional view through the lower part of the rear cover element in the extended position.

In the retracted inoperative position A, the pleat-like or fold-like sections 31 and 32 of the part 25 are disposed folded-together one above the other accordion-like so that the part 25, as viewed in the vehicle longitudinal direction, requires little structural space and does not protrude into the aperture 19 of the cooling air inlet. In the extended operating position B, the pleat-like or fold-like sections 31 and 32 assume an extended approximately straight position to one another whereby the sections 31 and 32 extend under an obtuse angle $\beta$ with respect to one another (FIG. 3). The pleat-like or fold-like sections 31 and 32 are connected with one another and with the adjoining rigid areas 30 and 33 of the part 25 by way of a film-joint hinge 34 each which extend over the entire width of the cover element 22. The relatively thin film-joint hinges 34 are made of a soft plastic material, for example, of a thermoplastic polyurethane whereas the remaining areas 30 to 33 of the part 25 consist of a relatively hard plastic material such as polycarbonate, ABS or the like.

In order that the thin-walled film-joint hinges are not continuously exposed to a UV-radiation through the air inlet grill 14, an extended, downwardly angularly bent arm 35 is formed-on at the H-shaped end area 33 of the part 25 which covers off the film-joint hinges 34 disposed therebelow in the folded-together position. Furthermore, an approximately L-shaped reinforcing rib 36 is attached at the rigid area 30 of the part 25 which cooperates with a pin 38 arranged at a guide member 37 of the adjusting mechanism 5 in such a manner that the part 25 is fixed in its extended operating position in the rearward direction (opposite the driving direction). In this position, the pin 38 abuts at the inside 39 of an upright web 40 of the reinforcing rib 36.

The adjusting mechanism 5, the lateral cover elements 33 and the actuating mechanism are described in detail as regards their construction and their function in the German Patent Application No. P 36 15 584.4 so that a detailed description thereof is dispensed with herein.

The part 25 of the cover element 22 is made in a single extrusion tool whereby the two different materials for the rigid areas 30 to 33 and the film-joint hinges 34 are placed into the tool at the same time and the part 25 is made in a single operating step.

While we have shown only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A spoiler arrangement for a rear engine driven motor vehicle comprising:
   a spoiler extending laterally across a rear section of a vehicle and covering at least a portion of an opening to a vehicle engine accommodating space;
   spoiler mounting means for mounting the spoiler for movement between an inoperative position substantially flush with adjacent exterior vehicle body parts and an operative position spaced outwardly from adjacent exterior vehicle body parts to enhance the vehicle aerodynamic characteristics; and
   cover element means for covering gaps formed between the spoiler and adjacent exterior vehicle body parts forming the opening when the spoiler is in said operative position whereby sucking in of exhaust gases and other contamination to said space from the rear of the vehicle rear is reliably prevented;
   wherein said cover element means includes a first cover member part extending laterally across a rearward portion of the spoiler and fixed thereto, a second cover member part mounted at the vehicle body, and a foldable cover member part interconnected between the first and second cover member parts, said foldable cover member part being configured to form a plurality of folds when the spoiler is in the inoperative position with the foldable cover member part stowed in the vehicle body.

2. A spoiler arrangement according to claim 1, wherein the second part is pivotably mounted at the vehicle body.

3. A spoiler arrangement according to claim 1, wherein the spoiler includes cooling air opening means which are aligned with an intake air opening communicated with a fan means for sucking in engine cooling air when the spoiler is in the inoperative position.

4. A spoiler arrangement according to claim 3, wherein a cover storage space is provided rearwardly of the intake air opening, and wherein said foldable part is adapted to be stored in said cover storage space when the spoiler is in the inoperative position 5. A spoiler arrangement according to claim 1, further comprising an adjusting mechanism for moving the spoiler between its operative and inoperative position, wherein the foldable cover member part is connected by way of a snap-in-type connection with the first cover member part, and wherein the second cover member part is secured at the adjusting mechanism.

6. A spoiler arrangement according to claim 1, wherein the foldable cover member part is constructed accordion-like-shaped with one fold disposed above the other and extended over the entire lateral width of the cover element means.

7. A spoiler arrangement according to claim 5, wherein the foldable cover member part is arranged between an approximately H-shaped upper end area and a plate-shaped lower area of the second cover member part.

8. A spoiler arrangement according to claim 5, wherein the snap-in-type connection includes a U-shaped receiving means at the foldable cover member part into which a tongue-shaped web of said first cover member part engages form-lockingly.

9. A spoiler arrangement according to claim 8 wherein the U-shaped receiving means is integrated into an H-shaped end area of said foldable cover member part.

10. A spoiler arrangement according to claim 6, wherein folds of the foldable cover member part are connected with one another and with adjoining areas by way of respective thin-walled film-joint hinge means.

11. A spoiler arrangement according to claim 9, wherein said foldable cover member part consists within the area of the film-joint hinge means of thermoplastic polyurethane while the remaining areas are made of a relatively hard plastic material such as polycarbonate, ABS or the like.

12. A spoiler arrangement according to claim 9, wherein an extended angularly bent arm is provided at the H-shaped end area of said foldable cover member part in the retracted inoperative position of the spoiler means, which bent arm protects the film-joint hinge means against direct UV radiation in the folded-together position.

13. A spoiler arrangement according to claim 12, wherein an L-shaped reinforcing rib is provided at said second cover member part which cooperates with a pin attached at a guide member of an adjusting mechanism in such a manner that said first-mentioned part is fixed opposite the driving direction when the spoiler is in the extended operating position.

14. A spoiler arrangement according to claim 5, wherein the foldable cover member part is constructed accordion-like-shaped with one fold disposed above the other and extended over the entire lateral width of the cover element means.

15. A spoiler arrangement according to claim 7, wherein the foldable cover member part is arranged between an approximately H-shaped upper end area and a plate-shaped lower area of the second member part.

16. A spoiler arrangement according to claim 15, wherein the snap-in-type connection includes a U-shaped receiving means at the foldable cover member part into which a tongue-shaped web of said first cover member part engages form-lockingly.

17. A spoiler arrangement according to claim 16, wherein the U-shaped receiving means is integrated into an H-shaped end area of said cover foldable member part.

18. A spoiler arrangement according to claim 16, wherein folds of the foldable cover member part are connected with one another and with adjoining areas by way of respective thin-walled film-joint hinge means.

19. A spoiler arrangement according to claim 18, wherein said foldable cover member part consists within the area of the film-joint hinge means of thermoplastic polyurethane while the remaining areas are made of a relatively hard plastic material such as polycarbonate, ABS or the like.

20. A spoiler arrangement according to claim 19, wherein an extended angularly bent arm is provided at the H-shaped end area of said foldable cover member part in the retracted inoperative position of the spoiler means, which bent arm protects the film-joint hinge means against direct UV radiation in the folded-together position.

21. A spoiler arrangement according to claim 20, wherein an L-shaped reinforcing rib is provided at said second cover member part which cooperated with a pin attached at a guide member of an adjusting mechanism in such a manner that said first-mentioned part is fixed opposite the driving direction when the spoiler is in the extended operating position.

22. A spoiler arrangement according to claim 14, wherein folds of the foldable cover member part are connected with one another and with adjoining areas by way of respective thin-wallet film-joint hinge means.

* * * * *